(12) United States Patent
Hughes, Jr.

(10) Patent No.: US 7,607,870 B2
(45) Date of Patent: Oct. 27, 2009

(54) ROTARY TUBE NOTCHING APPARATUS

(76) Inventor: Robert K. Hughes, Jr., 1601 SW. 18th Ave., Ocala, FL (US) 34474

( * ) Notice: Subject to any disclaimer, the term of this patent is extended or adjusted under 35 U.S.C. 154(b) by 0 days.

(21) Appl. No.: 11/591,715

(22) Filed: Nov. 2, 2006

(65) Prior Publication Data
US 2008/0107490 A1    May 8, 2008

(51) Int. Cl.
*B23B 47/28* (2006.01)
(52) U.S. Cl. .......................... 408/88; 408/89; 408/103; 408/110
(58) Field of Classification Search ............... 408/87, 408/88, 89, 90, 94, 103, 109, 116, 115 R, 408/110–112, 91, 104; 83/54, 456, 745
See application file for complete search history.

(56) References Cited

U.S. PATENT DOCUMENTS

| | | | | |
|---|---|---|---|---|
| 253,913 | A * | 2/1882 | Davis | 408/88 |
| 942,389 | A * | 12/1909 | Wiggins | 144/85 |
| 2,484,758 | A * | 10/1949 | Sonnie | 408/106 |
| 2,622,458 | A * | 12/1952 | Jenkins | 408/87 |
| 2,746,125 | A | 5/1956 | Cuny | |
| 2,849,900 | A * | 9/1958 | Heidtman, Jr. | 408/112 |
| 2,909,083 | A * | 10/1959 | Chestnut | 408/236 |
| 3,263,544 | A * | 8/1966 | Margolien | 83/409 |
| 3,288,183 | A * | 11/1966 | Eisbrenner | 144/136.1 |
| 3,333,488 | A * | 8/1967 | De Witt | 408/130 |
| 3,420,124 | A * | 1/1969 | Trevathan | 408/54 |
| 3,465,620 | A * | 9/1969 | Hilburn | 408/115 R |
| 3,626,513 | A * | 12/1971 | Pytlak | 408/115 R |
| 3,853,420 | A * | 12/1974 | Abell | 408/14 |
| 3,890,058 | A * | 6/1975 | Self et al. | 408/112 |
| 4,082,474 | A * | 4/1978 | Stiger | 408/110 |
| 4,123,189 | A | 10/1978 | Ferlise et al. | |
| 4,152,090 | A * | 5/1979 | Harris et al. | 408/104 |
| 4,242,016 | A * | 12/1980 | Faris | 408/14 |
| 4,391,558 | A * | 7/1983 | Perry | 408/110 |
| 4,585,376 | A * | 4/1986 | Davenport et al. | 408/110 |
| 4,729,698 | A * | 3/1988 | Haddon | 408/110 |
| 4,836,720 | A * | 6/1989 | Hadden | 408/112 |
| 4,865,496 | A * | 9/1989 | Challis | 408/115 R |
| 5,118,228 | A | 6/1992 | Story | |
| 5,150,993 | A * | 9/1992 | Miller | 408/110 |
| 5,630,576 | A | 5/1997 | Williams | |
| 5,797,708 | A * | 8/1998 | Bencic | 408/112 |
| 5,800,099 | A | 9/1998 | Cooper | |
| 6,308,944 | B1 | 10/2001 | Ota et al. | |
| 6,523,818 | B1 | 2/2003 | Le Vert et al. | |
| D474,093 | S * | 5/2003 | Chang | D8/71 |
| 6,634,631 | B2 | 10/2003 | Hebert | |

FOREIGN PATENT DOCUMENTS

| | | | |
|---|---|---|---|
| CH | 310900 | * | 1/1956 |
| DE | 19514979 A1 | * | 11/1995 |
| EP | 100421 A2 | * | 2/1984 |
| JP | 60141417 A | * | 7/1985 |
| JP | 03294104 A | * | 12/1991 |

* cited by examiner

*Primary Examiner*—Daniel W Howell
(74) *Attorney, Agent, or Firm*—Massinger Law Offices

(57) ABSTRACT

A rotary tube notching apparatus capable of operable attachment to a powered rotational drive device such as a drill, is comprised of a surface mountable tube support assembly capable of alternately receiving straight or bent tubing; a height adjustable carriage assembly pivotally mounted to the tube support assembly to enable offset notching, and a shaft assembly rotatably mounted to said carriage assembly for receiving a cutting tool.

8 Claims, 6 Drawing Sheets

ROTARY TUBE NOTCHING APPARATUS

FIELD OF THE INVENTION

The subject invention relates to tube notchers generally, and to an adjustable rotary tube notching apparatus capable of performing straight, angled and offset cuts in both straight and bent tubing, in particular.

BACKGROUND OF THE INVENTION

In order to manufacture products comprised of tubular metal, such as automotive exhaust systems, roll-cages and numerous other framed support structures, it is necessary to join sections of hollow metal tubing by means of arc welding, electron beam welding, laser welding and brazing or soldering. In order to accomplish proper interconnection of such tubing members for permanent union it is first necessary to "notch" one of the tubes so that it matingly conforms to the exterior surface of the tube to which it is to be connected. Several methods have been employed to achieve the desired fit of such abutting tubular surfaces including the use of hand-held coping tools, punch and die combinations and band saws. The subject invention relates to yet another species of notching apparatus, namely a rotary cutting tool or "hole saw".

Heretofore, a variety of rotary cutting devices have been designed to produce precisely contoured ends of tubing for connection with the periphery of another tubing member. Some such devices are hand-held while others are surface mounted. Of this latter type, some are designed to maintain the cutting tool in vertical orientation above the work piece, such as by mounting the device in a drill press or in a vice and attaching a hand drill. The orientation of the work piece relative to the cutting tool is then manipulated to achieve the proper angle of penetration. A first problem with this arrangement is that there is often insufficient room to properly position elongate tube members since movement is impeded by either the floor (when adjusting the tube about a vertical plane) or by surrounding walls or other table mounted equipment (when adjusting the tube about a horizontal plane). A second problem frequently encountered is that the weight of the hand drill causes the cutting member to descend too rapidly into the work piece which can result in binding and/or damage to the work piece.

In order to obviate the shortcomings and limitations of the above described prior art surface-mounted tube notching devices it has been found useful to achieve the desired angles of penetration by retaining the work piece in a fixed and preferably horizontal position while adjusting the orientation of the cutting tool relative thereto, rather than visa versa. One such device is described in U.S. Pat. No. 5,118,228 issued to Story in 1992. Story teaches that a length of steel tubing may be confined within a pipe support unit using clamping means and an articulated cutter head unit may then be aligned to intersect the midpoint of the steel tubing at a desired angle. The key here is that the work piece remains stationary and secure while the cutter head is disposed at a selected angular orientation relative to the work piece. The hand drill is then attached to the shaft of the cutter head to impart rotary motion. An apparent shortcoming of the Story device, is that the carriage unit which supports the cutter head unit is comprised of two relatively thin and elongated arms which are likely to bend under the weight of an attached hand drill thereby causing misalignment of the cutting head and pipe.

Moreover, tube notching devices of the prior art are neither designed for nor suited to create offset notches in the work piece (i.e., where the center of the hole saw does not intersect the longitudinal axis of the work piece) or to notch curved sections of bent tubing. In view of the shortcomings and limitations of the prior art there has existed a longstanding need for a rotary tube notching apparatus designed to securely holding both straight and bent tubing and having means for adjusting the orientation of the cutting mechanism about both a horizontal and vertical plane such that it may create straight, angled and offset notches in the work piece. The subject apparatus fulfils these objectives and others as set forth in greater detail herein.

SUMMARY OF THE INVENTION

The subject invention more specifically relates to a rotary tube notching apparatus capable of operable attachment to a powered rotational drive device such as a drill, the notching apparatus being generally comprised of a surface mountable tube support assembly having a first and second tube receiving locations; a height adjustable carriage assembly pivotally mounted to the tube support assembly, and a shaft assembly rotatably mounted to said carriage assembly.

In practice a cutting tool, namely a hole saw, and a hand drill are operatively mounted to opposite ends of the shaft assembly in traditional fashion. A length of straight tubing is then secured to the second tube receiving location of the tube support assembly via clamping means. Alternatively, a length of bent tubing may be secured to the first tube receiving location using the identical clamping means. Thereafter, the carriage assembly will be rotated about its pivot point until the axis of rotation of the cutting tool is aligned to intersect the tubing at the desired angle. The carriage assembly includes an angle scale to facilitate proper alignment. Next, the height of the cutting tool may be optionally adjusted to enable offset notching of the work piece if so desired. The drive device is then activated and axial force applied thereto to bring the cutting tool in severing engagement with the work piece.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a tube notching apparatus capable of operable attachment to a powered rotational drive device such as a drill and further capable of performing straight, angled and offset notching.

It is another primary object of the subject invention to provide a tube notching apparatus designed to notch both straight and bent tubing of a wide variety of diameters.

Another object of the subject invention is to provide a tube notching apparatus capable of notching tubes which are either circular or square in cross section.

Still another object of the subject invention is to provide a tube notching apparatus designed to secure and maintain the work object in a substantially horizontal position regardless of the angle of notch being created thereby enabling the device to be located closer to surrounding walls if desired or necessary and reducing the overall work space required to perform notching tasks.

Yet another object of the subject invention is to provide a tube notching apparatus designed such that all major components are in close proximity to one another and constructed in such manner as to eliminate unwanted movement during operation thereby assuring proper alignment of cutting means and work object.

It is also an object of the subject invention to provide a tube notching apparatus that is comprised of relatively few components to facilitate easy assembly and use as well as reduce the chances of mechanical failure.

Another object of the subject invention is to provide a rotary tube notching apparatus which is relatively simple in design and therefore capable of rapid construction at relatively low costs.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
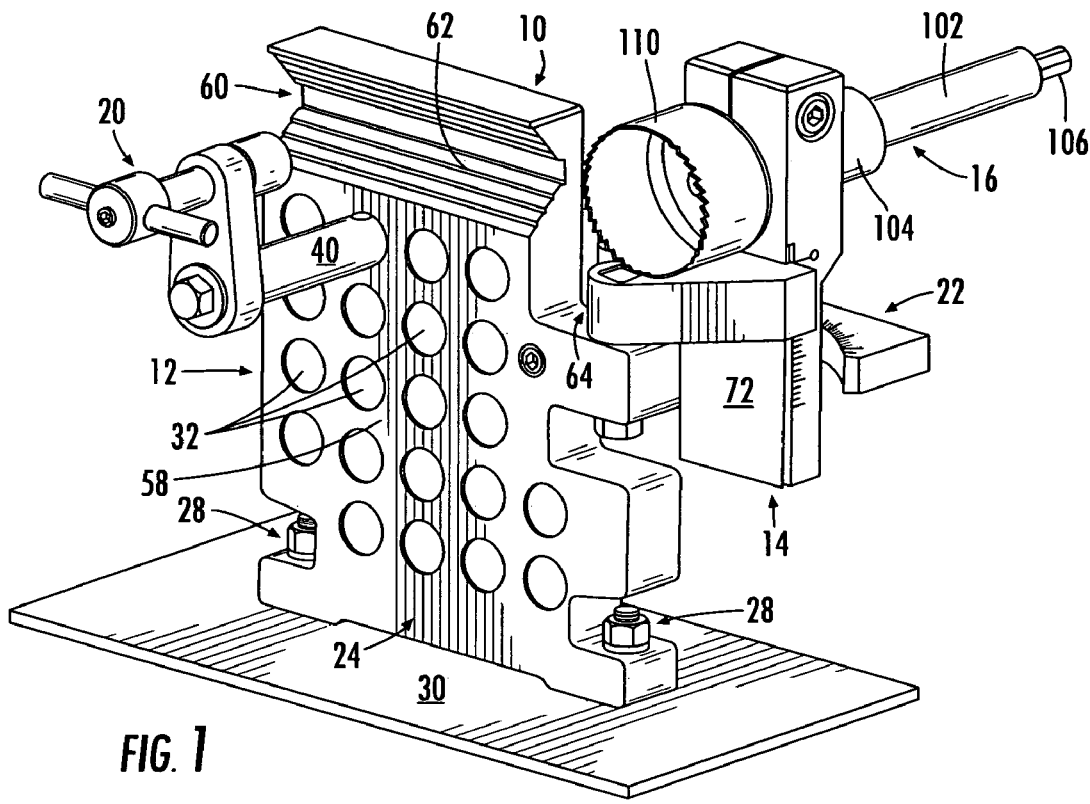
FIG. 1 is a front perspective view of the subject adjustable rotary tube notching apparatus shown fixedly mounted to a work surface and having a cutting tool operatively mounted to the shaft assembly.
Figure 2:
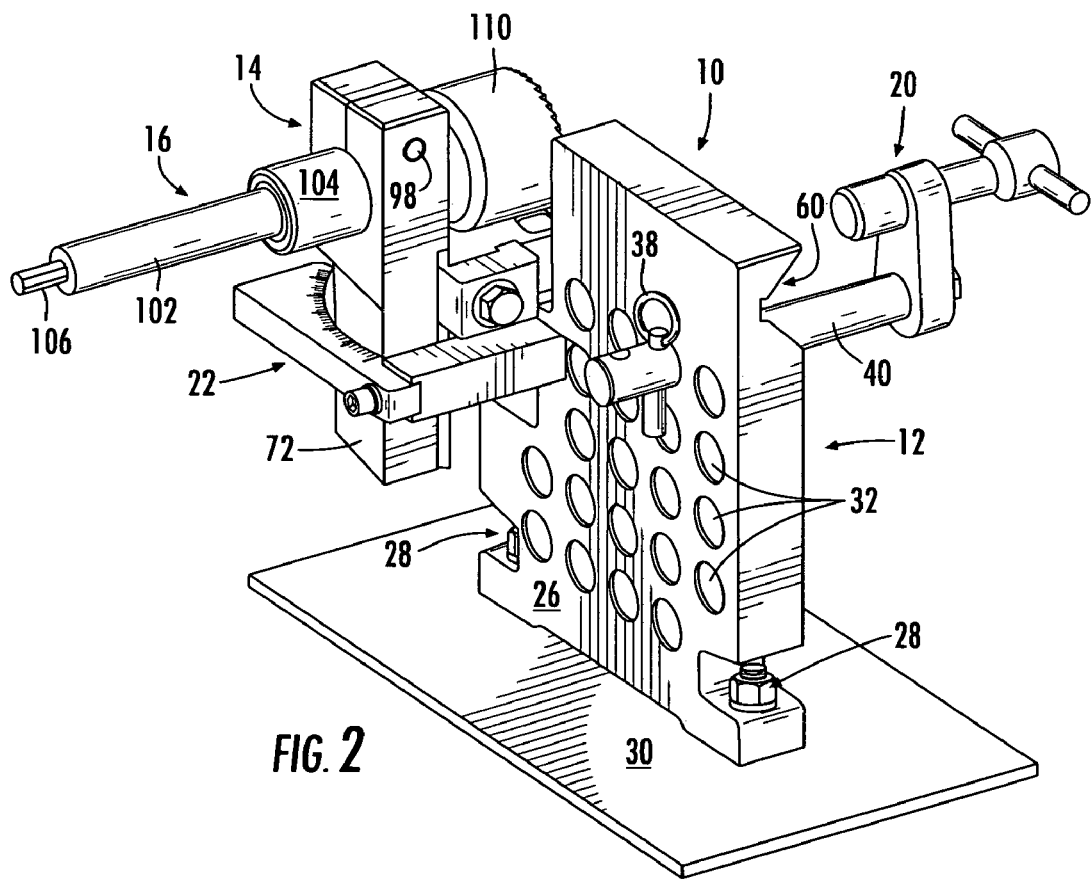
FIG. 2 is a rear perspective view of the invention of FIG. 1.

Reference is now made to FIGS. 1 and 2 in which there is illustrated front and rear views, respectively, of the subject rotary tube notching apparatus (hereinafter sometimes also referred to as simply "notching apparatus" or "tube notcher"), designated generally by reference numeral 10. In its broadest sense, the subject invention is a rotary tube notching apparatus capable of operable attachment to a powered rotational drive device such as a drill, and is comprised of three primary components, namely a surface mountable tube support assembly 12; a height adjustable carriage assembly 14 pivotally mounted to tube support assembly 12, and a shaft assembly 16 rotatably mounted to carriage assembly 14. Each of these components is more fully described below in seriatim, followed by a description of the functionality of the apparatus as a whole.

Tube support assembly 12 is comprised of a vertical frame member 18, tube retention means 20, and angle indicator 22 (described infra). Vertical frame member 18 is preferably but not essentially substantially rectangular in shape and includes front side 24 (also referred to herein as "tube receiving side 24") and rear side 26 (also referred to herein as "non-tube receiving side 26"). Vertical frame member 18 further includes mounting means 28 which in the embodiment illustrated is comprised of a pair of suitably sized bolts mounted through the mounting surface 30 and holes provided at the base of vertical frame member 18 together with corresponding nuts, flat washers and lock washers. As an alternative, vertical frame member 18 may be mounted in a vise or other suitable holding fixture.

Figure 3:
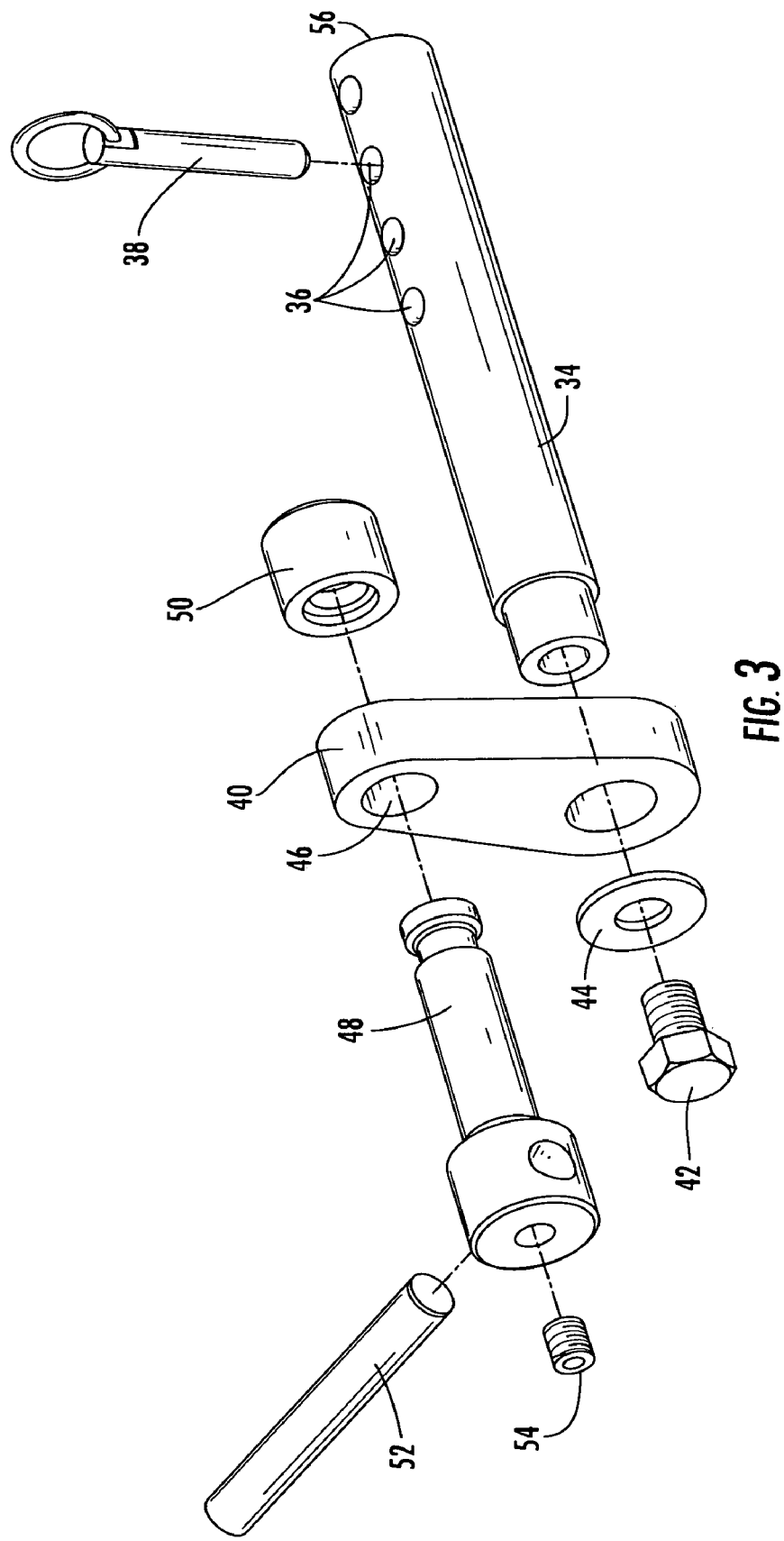
FIG. 3 is an exploded view of the tube clamp component of the tube support assembly of the subject invention.

With continued reference to FIGS. 2 and 3, it may be readily observed that vertical frame member 18 includes a plurality of tube clamp mounting holes 32 disposed there through and incrementally spaced apart from one another in a series of columns and rows. Tube clamp mounting holes 32 are each sized to receive tube retention means 20 which is preferably but not essentially comprised of a tube clamp constructed as illustrated in FIG. 3. More specifically, the tube clamp of the subject invention includes a clamp rod 34 having a diameter which permits smooth slidable engagement within any of the mounting holes 32. Clamp rod 34 has a plurality of incrementally spaced transverse pin holes 36 for the receipt of a hitch pin 38 as best seen in FIG. 2. One end of clamp rod 34 is adapted for slidable engagement with a clamp arm 40 which is secured in perpendicular fashion with bolt 42 and washer 44. Clamp arm 40 includes an aperture 46 and clamp screw 48 which are reciprocally threaded. A first end of clamp screw 48 is adapted to receive thereon a swivel pad 50 which as best observed upon reference to FIGS. 8-11 is caused to be urged against the outer surface of a hollowed work piece 100 ("tube") when screw 48 is tightened using handle 52 mounted to the opposite end of screw 48 via set screw 54. As should be readily appreciated, clamp arm 40 is retained within a selected tube clamp mounting hole 32 by inserting hitch pin 38 into a pin hole 36. Moreover, the distance of swivel pad 50 from tube receiving side 24 depends upon which pin hole is selected for receipt of hitch pin 38. A pin hole closer to end 56 of clamp rod 34 should be selected for when notching is performed on tubing of greater diameter.

An important design element of the subject invention is that vertical frame member 18 has two separate locations for receiving and retaining a tubular work piece. First tube receiving location 58 is planar in shape and defined by that area of front side 24 which is perforated with tube clamp mounting holes 32. As best understood upon reference to FIG. 11, a work piece 100 may be frictionally mounted to first tube receiving location 58 using tube retention means 20 which is preferably the above described tube clamp assembly or alternatively a U-bolt saddle clamp which may be mounted using two of the mounting holes 32, or any other suitable clamping device such as a C-lamp for instance. Tube retention means which are mounted within mounting holes 32 are preferred over free-standing clamps (such as the aforementioned C-clamp) because clamp slippage is less likely to occur. First tube receiving location 58 is ideal for securing irregularly shaped tubing such as bent tubes, but may be employed for straight tubing as well. Second tube receiving location 60 is a horizontally disposed recess situated across the top portion of frame member 18 and is preferably but not essentially V-shaped in cross section. The surface of second tube receiving location 60 is preferably scored, cast, machined or otherwise equipped with a plurality of longitudinal grooves 62 which are intended to reduce slippage of the work piece 100.

Figure 4:
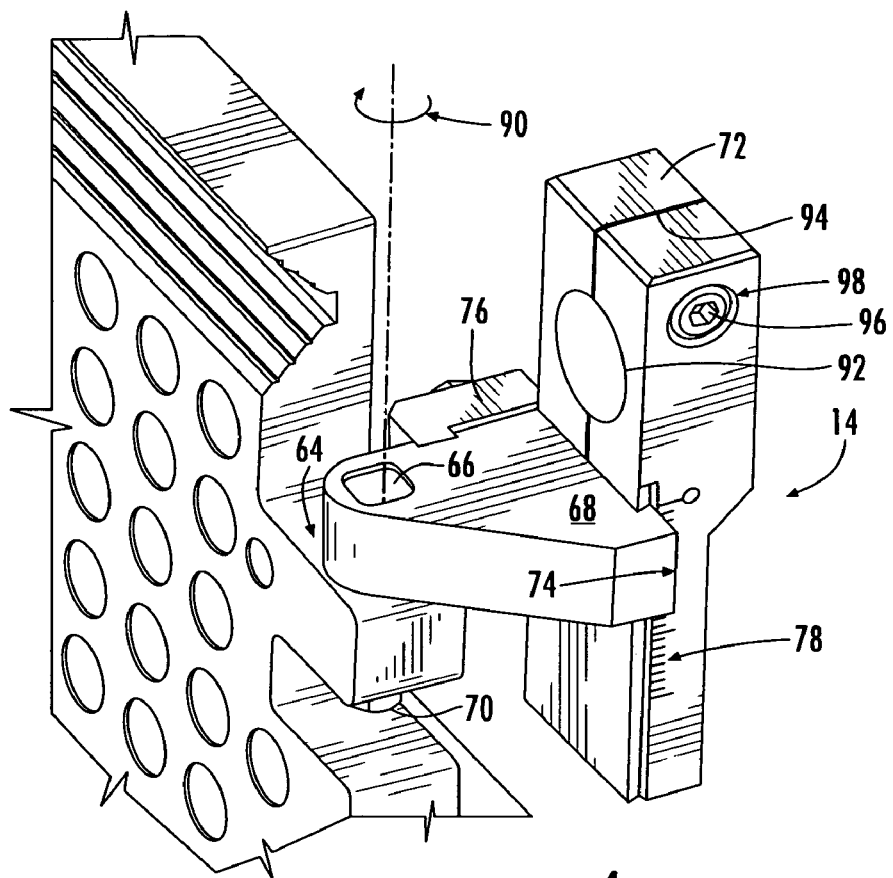
FIG. 4 is an enlarged front perspective view of the carriage assembly of the subject invention.
Figure 5:
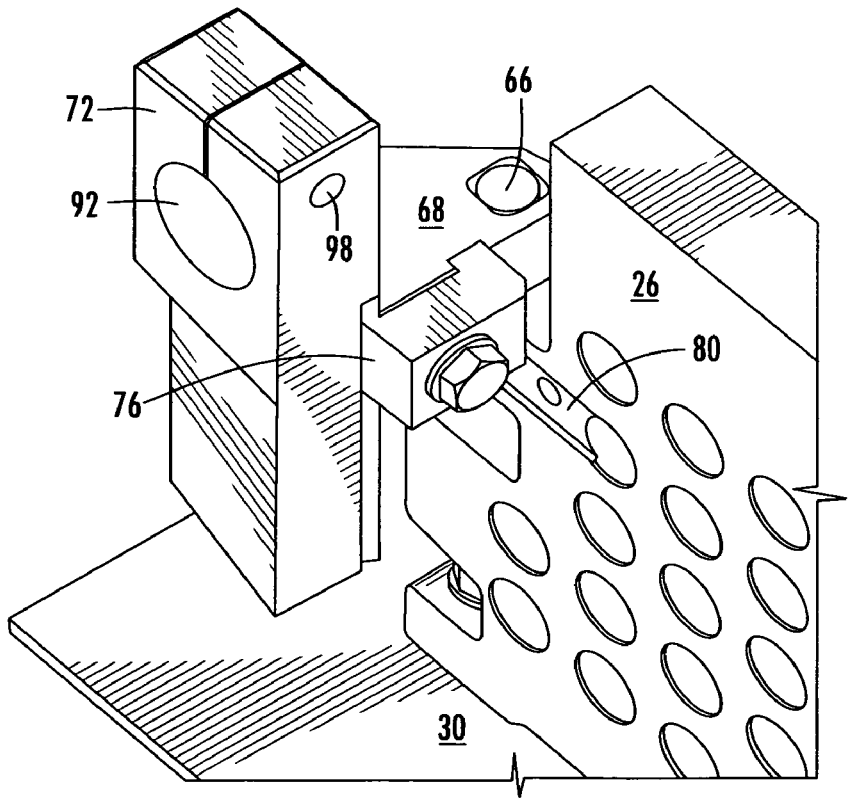
FIG. 5 is an enlarged rear perspective view of the carriage assembly of the subject invention.

Reference is now invited to FIGS. 4 and 5 wherein front and rear views, respectively, of carriage assembly 14 may be observed. Vertical frame member 18 of tube support assembly 12 is adapted with a shoulder 64 upon which carriage assembly 14 is pivotally mounted using a bolt 66 or other suitable pivot pin. Bolt 66 is inserted through a vertical hole (not shown) located in swivel 68 and a concentrically aligned second vertical hole (not shown) in the underlying shoulder 64. In a preferred embodiment, the aperture of swivel 68 through which bolt 66 is inserted is countersunk and squared to prevent the bolt from turning during rotational adjustment of swivel 68 to achieve desired notching angles. Bolt 66 is secured using nut 70 which may be alternately loosened and tightened to permit movement of swivel 68 or to lock it in a desired position, respectively. Swivel 68 is preferably but not essentially triangular in shape and occupies a horizontal plane when mounted to vertical frame member 18. A vertical slide 72 is slidably mounted to the leg 74 of swivel 68 opposite pivot 66 and is releasably secured using vertical slide clamp 76 in a manner well known to those skilled in the art. Vertical slide 72 includes a scale 78 to measure the scope of its vertical movement relative to swivel 68. A horizontal corner edge of swivel 68 serves as the pointer.

Figure 6:
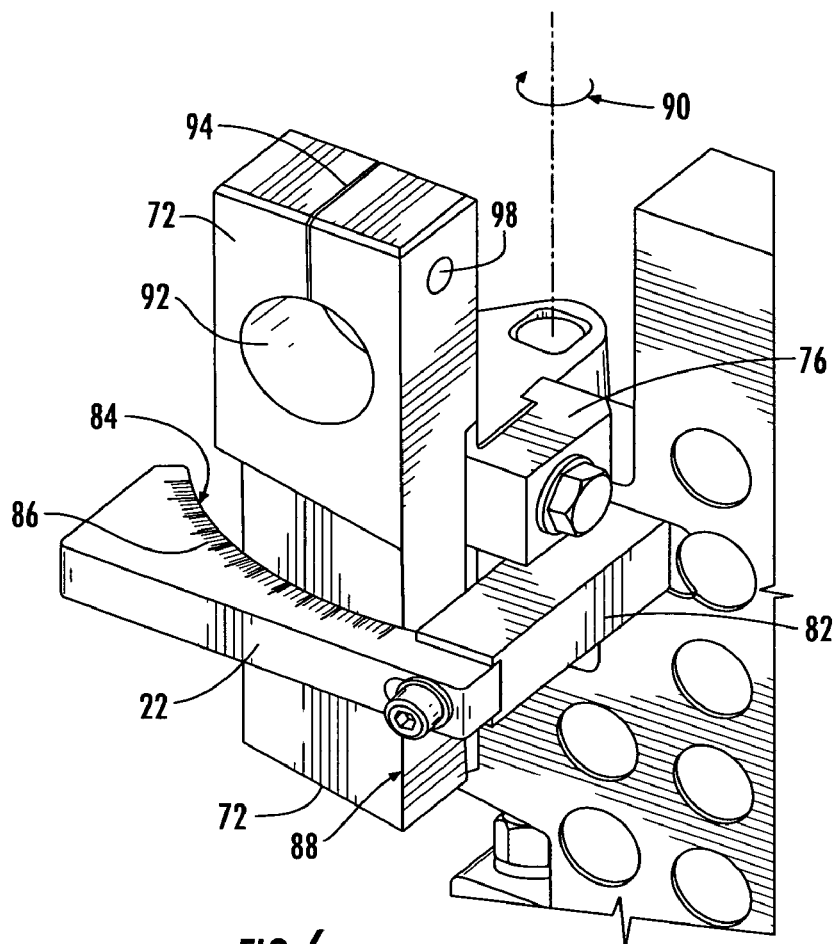
FIG. 6 is an enlarged rear perspective view of the angle scale mounted to the subject invention.
Figure 7:
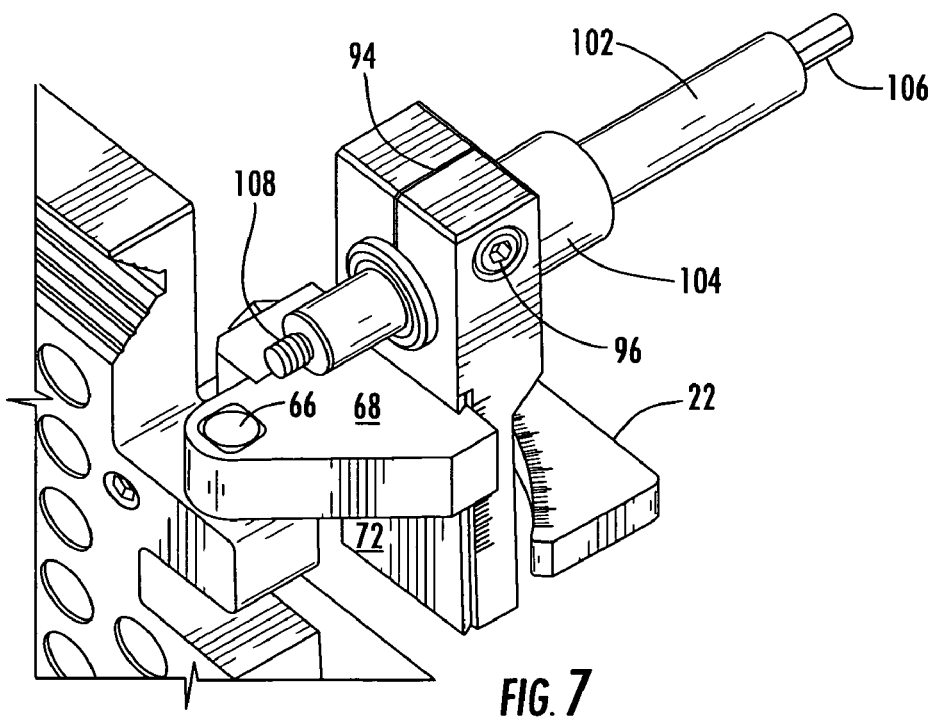
FIG. 7 is an enlarged front perspective view of the angle scale mounted to the subject invention.

With particular reference to FIG. 5, vertical frame member 18 is further modified with a recess 80 located on its non-tube supporting side 26 to receive a first end of perpendicularly mounted angle indicator mount 82 (FIG. 6). The aforementioned angle indicator 22 is appended to the opposite end of angle indicator mount 82 in perpendicular fashion and on a horizontal plane and has an arcuate side wall 84 facing vertical slide 72 and bearing an angle scale 86. Thusly positioned, angle indicator 22 provides a means for measuring the angle of rotation of swivel 68, and more particularly the shaft assembly 16 mounted thereto, relative to a mounted work piece 100. As best observed in FIG. 6, a vertical corner edge 88 of vertical slide 72 stays in close proximity to angle scale 86 as carriage assembly 14 is rotated about pivot 66 along arc of rotation 90 and therefore serves as the pointer. Finally, a shaft assembly receiving aperture 92 is disposed through the center of vertical slide 72, preferably above swivel 68. Shaft assembly receiving aperture 92 is in communication with radial groove 94 which bisects the top of vertical slide 72 to provide freedom of movement of the resulting halves such that they may be drawn together by tightening of socket head cap screw 96 (FIG. 7) when inserted in reciprocally threaded transverse aperture 98 (FIG. 6). The resulting decrease in circumference of aperture 92 secures shaft assembly 16 in place.

Referring once again to FIG. 7, shaft assembly 16 is comprised of elongate shaft 102 rotatably mounted within bearing sleeve 104 which preferably houses 1" inner diameter double-sealed needle bearings. The distal end 106 of shaft 102 (relative to vertical frame member 18) is adapted for operative engagement with a powered rotational drive device, preferably a ½" drill and has been milled on three sides to prevent the chuck from slipping and therefore works well with a keyless chuck. The opposite or proximal end 108 of shaft 102 is threaded for operative engagement with cutting member 110, namely a bi-metalic hole saw. Note that the axis of rotation of shaft 102 will lie on the same plane as the longitudinal axis of second tube receiving location 60 when vertical slide 72 is 'zeroed out' on vertical slide scale 78. Thusly positioned, straight or angled cuts may be performed on a work piece 100 mounted in second tube receiving location 60 while assuring that the axis of rotation of cutting member 110 intersects the longitudinal axis of the work piece regardless of the selected angle of penetration. Offset cuts (i.e., when the saw's axis of rotation does not intersect with the longitudinal axis of the work piece) may be performed by adjusting the vertical slide 72 upward to the desired height, thereby elevating cutting member 110 as well. It is worth noting at this point that where the tube to which the notched tube is to be joined is of substantially the same diameter as the notched tube cutting member 110 should be of substantially the same diameter of the tube being notched. However, when the diameter of the tube to which the notched tube is to be joined is of larger diameter than the notched tube, the cutting member 110 must be of similarly larger diameter to assure proper mating conformation.

METHODS OF USE

Figure 8:
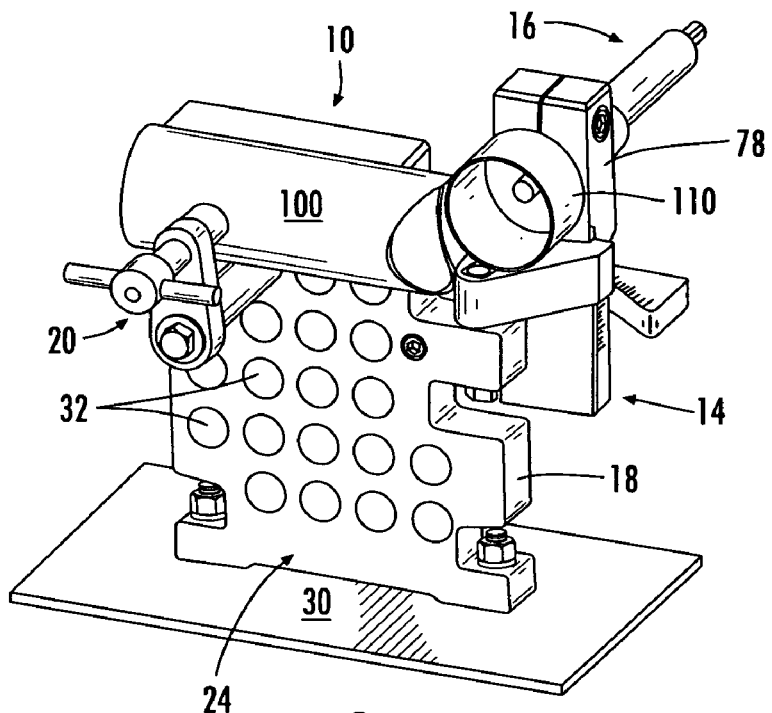
FIG. 8 is an illustration of the subject invention adjusted to perform a straight cut on a mounted tube.
Figure 9:
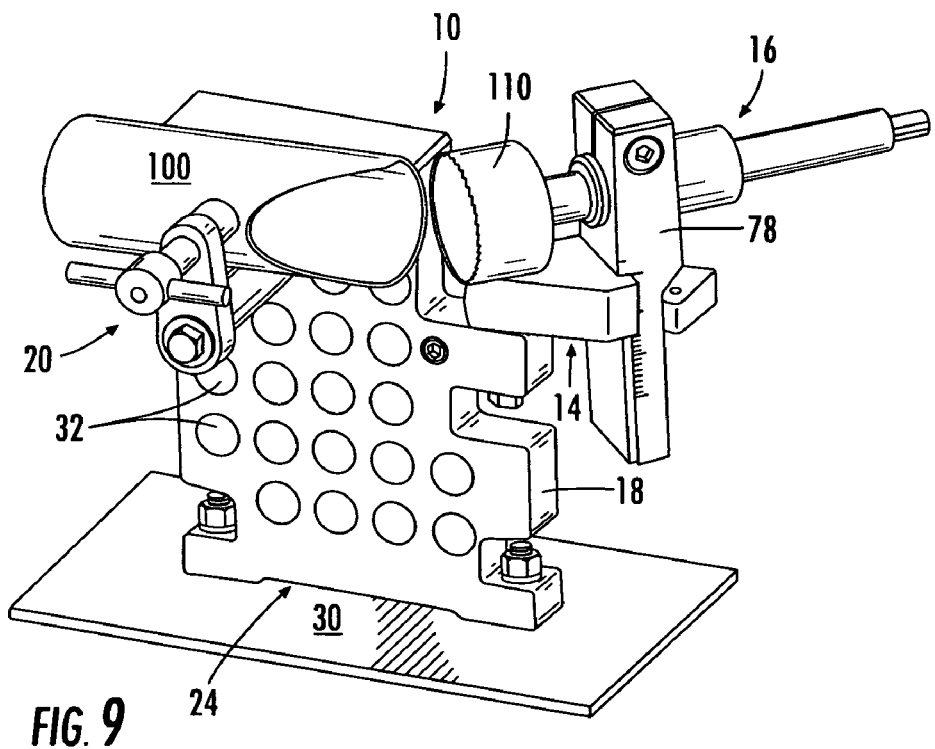
FIG. 9 is an illustration of the subject invention adjusted to perform an angled cut on a mounted tube.
Figure 10:
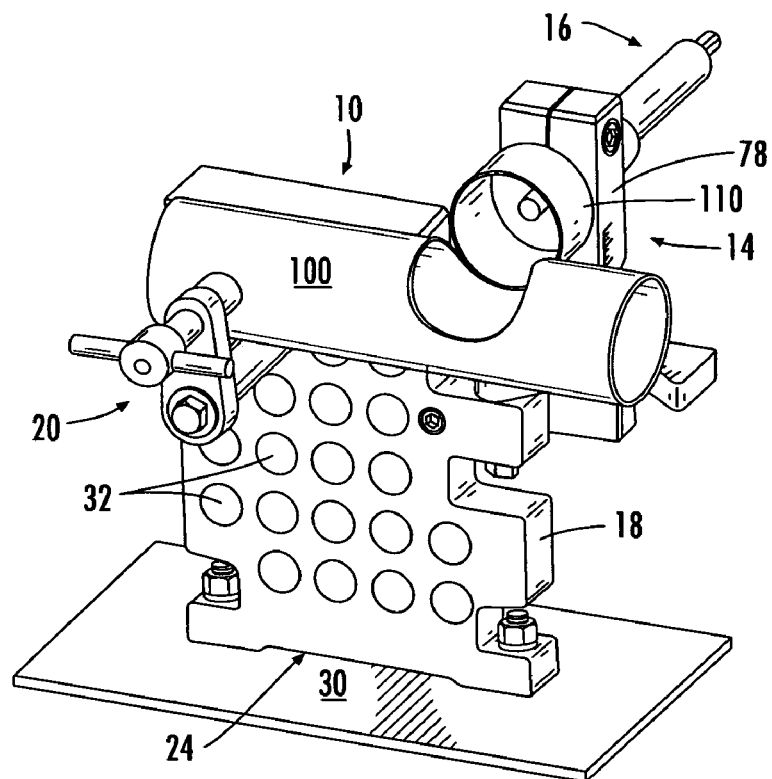
FIG. 10 is an illustration of the subject invention adjusted to perform an offset cut on a mounted tube.

In practice, cutting member 110 and a hand drill (not shown) are operatively mounted to opposite ends of shaft 102 in the conventional manner. Referring to FIGS. 8 and 9 methods of performing straight and angled cuts, respectively, may now be described. First, a length of straight tubing 100 is secured to second tube receiving location 60 of tube support assembly 12 by tightening clamp-screw 48 until swivel pad 50 is caused to force the work piece against second tube receiving location 60. Note that one of the tube clamp mounting holes located in the top row will be used when second tube receiving location 60 is selected to secure the work piece. It is preferred to position tube retention means 20 as close as possible to cutting member 110 without cutting into the clamp itself. Thereafter, carriage assembly 14 will be rotated about pivot point 66 until the axis of rotation of the cutting tool is aligned to intersect the tubing at the desired angle as may be observed on angle scale 86. The drive device is then activated and axial force applied thereto to bring cutting member 110 in severing engagement with the work piece in a manner well known to those skilled in the art.

For offset notching (illustrated in FIG. 10) the same procedure as described immediately above is followed, however, the height of cutting member 110 will be adjusted until the desired offset relative to the work piece is achieved as may be measured on vertical slide scale 78.

Figure 11:
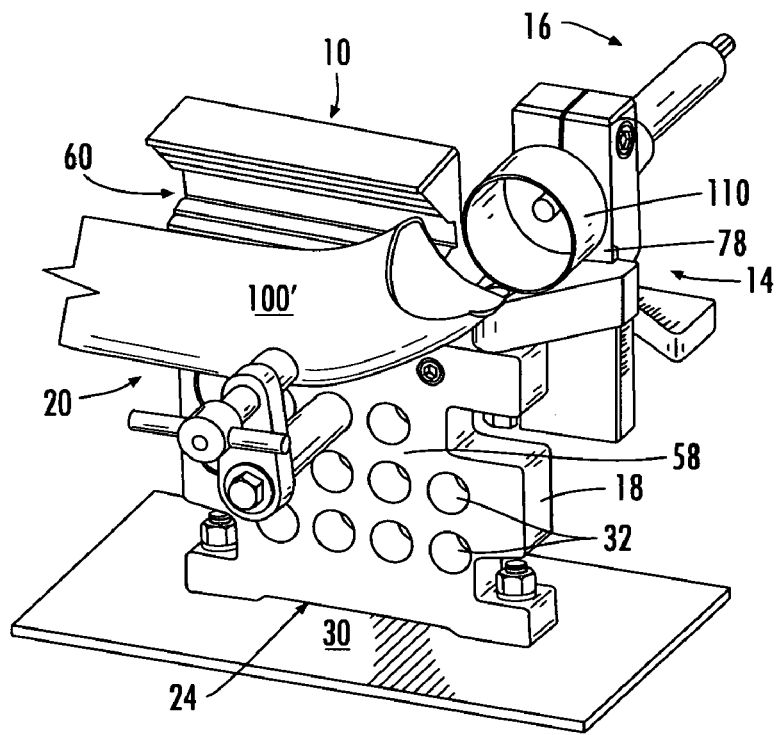
FIG. 11 is an illustration of the subject invention adjusted to perform a straight cut on a mounted bent tube.

In some instances it may be desirable to notch a bent section of tubing. This location of notch is frequently encountered when constructing racecar door bars, guard railing and framing for boats, for example. Referring now to FIG. 11, the versatility of the subject apparatus may be more fully appreciated. Specifically, FIG. 11 illustrates the manner in which a length of bent tubing 100' may be received on planar first tube receiving location 58 and secured via tube retention means 20. The multiplicity of tube clamp mounting holes 32 spaced evenly over the surface of first tube receiving location 58 provide numerous placement options for tube retention means 20 thereby facilitating tube placement. Moreover, the ability of the tube clamp assembly to rotate 360 degrees in each mounting hole provides even greater ease of tube placement and mounting. It should also be understood that more than one tube clamp may be used to secure to secure the work piece. It is preferable to mount the work piece such that the straight portion is oriented horizontally with the bent section curving upward toward the shaft assembly generally and cutting member 110 in particular. As may be observed, it will often be necessary to adjust the height of vertical slide 72 to achieve the desired alignment of cutter and work piece.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A rotary tube notching apparatus capable of operable attachment to a powered rotational drive device, the apparatus comprising:
   a. a tube support assembly for alternately receiving a straight or bent tube, said tube support assembly being comprised of a frame member having a tube receiving side, said tube receiving side having a planar tube receiving location and a recessed V-shaped tube receiving location, said planar tube receiving location having a plurality of tube clamp mounting holes and tube retention means mounted within one of said plurality of tube clamp mounting holes for securing said straight or bent tube to said tube receiving location or said recessed V-shaped tube receiving location;
   b. a height adjustable carriage assembly pivotally mounted to said tube support assembly, said carriage assembly being comprised of 1) a swivel pivotally mounted to said tube support assembly, said swivel having an axis of rotation, and 2) a slide adjustably engaged with said swivel along an axis parallel with said axis of rotation of said swivel; and
   c. a shaft assembly rotatably mounted to said carriage assembly for receiving a cutting tool.

2. The rotary tube notching apparatus of claim 1, wherein said tube support assembly is further includes a non-tube receiving side opposite said tube receiving side, and an angle indicator mounted to said non-tube receiving side for measuring the degree of rotation of said carriage assembly.

3. The rotary tube notching apparatus of claim 1, wherein said shaft assembly is mounted to the said above said swivel.

4. The rotary tube notching apparatus of claim 1, wherein said slide is mounted behind said non-tube receiving side of said support assembly.

5. The rotary tube notching apparatus of claim 1, wherein said shaft assembly includes a shaft rotatably mounted within said carriage assembly, said shaft having a cutting member mounted thereto, said shaft being slidable within said carriage assembly such that said cutting member may be brought into severing engagement with a straight or bent tube mounted to said tube support assembly.

6. The rotary tube notching apparatus of claim 5, wherein said cutting member may be brought into severing engagement with an end of said straight or bent tube.

7. The rotary tube notching apparatus of claim 5, wherein said cutting member has an axis of rotation that intersects the longitudinal axis of said straight or bent tube.

8. The rotary tube notching apparatus of claim 5, wherein said cutting member has an axis of rotation that is off-set from the longitudinal axis of said straight or bent tube.

* * * * *